Sept. 16, 1924.
L. H. TIMMONS
SPRING
Original Filed Aug. 3, 1922
1,508,487
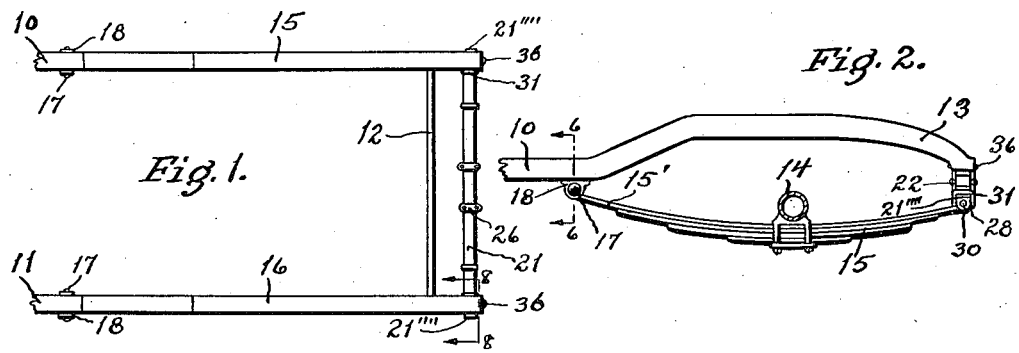
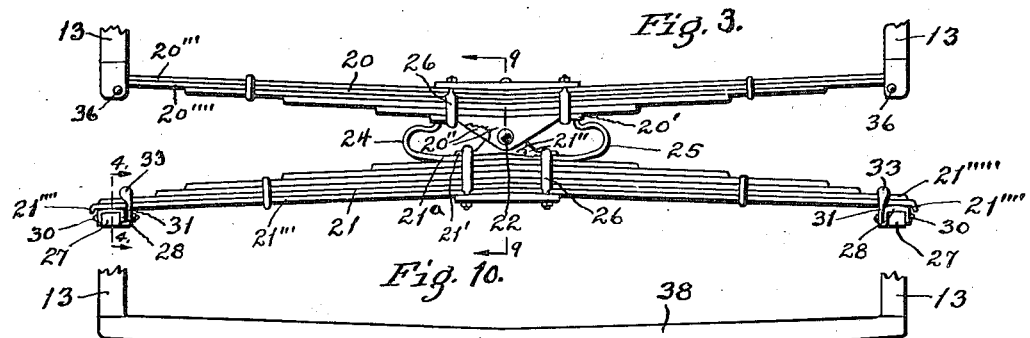
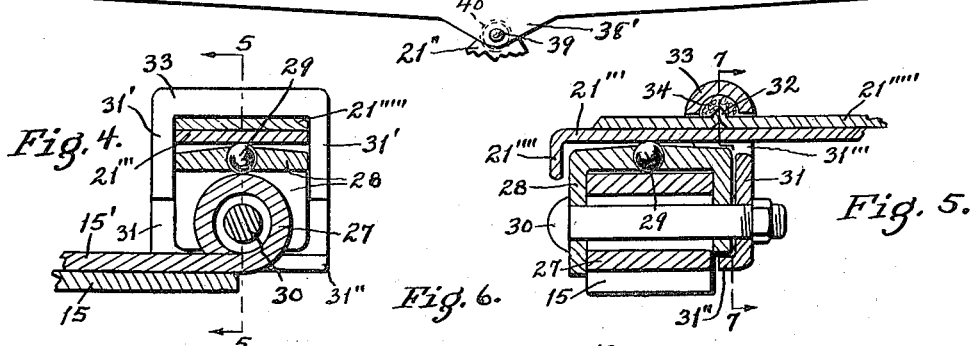
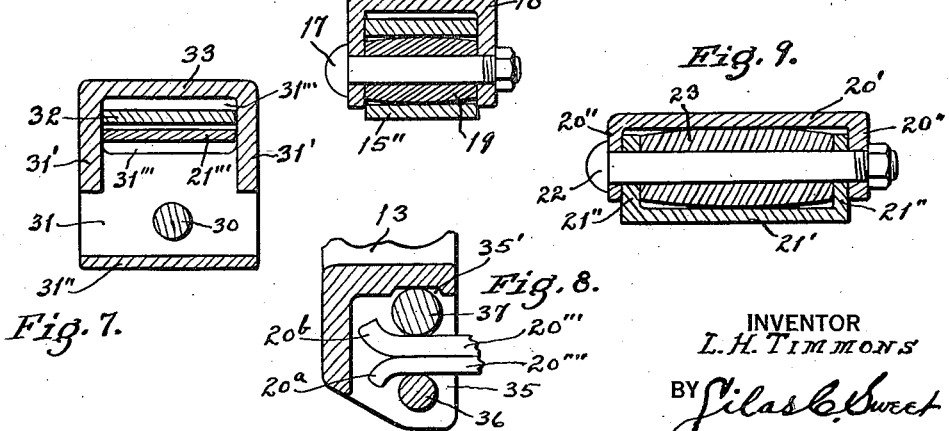
INVENTOR
L. H. Timmons
BY Silas C. Sweet
ATTORNEY Patented Sept. 16, 1924.

1,508,487

UNITED STATES PATENT OFFICE.

LINDSAY H. TIMMONS, OF DES MOINES, IOWA, ASSIGNOR OF ONE-HALF TO GEORGE B. FROST, OF DES MOINES, IOWA.

SPRING.

Original application filed August 3, 1922, Serial No. 579,490. Divided and this application filed February 2, 1924. Serial No. 690,115.

*To all whom it may concern:*

Be it known that I, LINDSAY H. TIMMONS, a citizen of the United States of America, and resident of Des Moines, Polk County, Iowa, have invented a new and useful Spring, of which the following is a specification.

The subject matter of this application was formerly included in and was divided from my application filed August 3, 1922, Serial Number 579,490.

The principal object of this invention is to provide improved means for limiting and minimizing lateral vibrations of the frame and body carried thereon, relative to the axles of an automobile, with consequent limiting and minimizing of friction and wear of parts as well as comfort to the occupants.

A further object of this invention is to provide improved means whereby the range of vertical vibration of an axle and wheels, or either of them, is materially enlarged or lengthened without noticeable reaction on the frame or body of an automobile, thus permitting the use of such automobile on very rough, choppy and transversely rutted roadways without noticeable vertical vibration, jarring or jolting of the frame or body, avoiding a large amount of blows of the load on the tires of the wheels and materially increasing the life and usefulness of said tires.

A further object of this invention is to provide a relief spring (in any desired number, auxiliary to the main spring or springs between the axles and load of an automobile), and connections including a rolling contact member between said relief spring and the main spring or springs whereby risk or danger of breakage of the main spring or springs under impact, reaction or torsion is minimized or eliminated.

A further object of this invention is to provide an improved construction for automobile platform springs whereby shackles are omitted and a cross-connection is substituted for each of them including a rolling contact member and confining or stirrup members.

A further object of this invention is to provide improved means for connecting a hammock or semi-elliptic spring to the rear horns of an automobile frame.

A further object of this invention is to provide improved means for connecting a semi-elliptic spring at its ends to the rear ends of side semi-elliptic springs of an automobile, whereby lateral vibration of the frame and body relative to the side springs is minimized or eliminated.

A further object of this invention is to provide improved means for connecting the rear ends of side springs to the rear ends or horns of the frame of an automobile, by end semi-elliptic springs placed back to back, connected pivotally in their central portions by a rolling contact member and connected at their ends to the side springs and horns respectively, producing a three-point suspension for the rear end of the vehicle.

My invention consists in the construction, arrangement and combination of elements hereinafter set forth, pointed out in the claims and illustrated by the accompanying drawing, in which—

Figure 1 is a bottom plan view, and Figure 2 a side elevation, of the rear end portion of an automobile frame showing my improved spring assembly applied thereto. Figure 3 is a rear end view of the same, on an enlarged scale. Figure 4 is an elevation, partly in section on the line 4—4 of Figure 3. Figure 5 is a vertical section on the line 5—5 of Figure 4. Figure 6 is a vertical section on the line 6—6 of Figure 2. Figure 7 is a vertical section on the line 7—7 of Figure 5. Figure 8 is a vertical section on the line 8—8 of Figure 1. Figure 9 is a cross-section on the line 9—9 of Figure 3. Figures 4 to 9 inclusive are on an enlarged scale.

Figure 10 is a fragmentary rear view showing a modified form of platform spring construction.

In the construction of the machine as shown the numerals 10, 11 designate side bars of an automobile frame of common construction, which are suitably and rigidly connected by cross-bars 12 spaced apart, one of which is shown in Figure 1. Each side bar 10, 11 is formed with an arched horn 13 at its rear end, the upward arching thereof providing space for upward movement of a rear axle such as 14 across the horizontal plane of the major portions of said bars. The side bars 10, 11 and cross-bars 12, including the horns 13 and other members not herein shown, are sometimes referred to as the frame and said frame is adapted to support a body, motor, hood, step-boards, skirts, fenders and other parts and accessories desired to be used in and on an automobile, parts being omitted that do not relate intimately to the present invention. The front springs and their connections to the frame, by means of special relief-springs, are illustrated, described and claimed in my parent application above referred to.

Rear side springs 15, 16 are arranged beneath and substantially parallel with the arched portions 13 of the side bars 10, 11. The side springs 15, 16 are semi-elliptic in form and of laminated type and are arched downwardly in opposition to the upward arching of the portions 13. The uppermost leaf 15' of each side spring 15, 16 is formed on its forward end with an eye 15" (Fig. 6) pivoted on a transverse bolt 17 carried in a horizontal position by brackets 18 secured to and depending from the side bars 10, 11, and a bushing or roller 19 preferably is pivoted on said bolt within said eye and confined at its ends by portions of said brackets. The bushing or roller 19 preferably is barrel-shaped, that is tapering in diameter from its central portion toward both ends. This shape and arrangement of the bushing insures contact of the eye therewith at all times, in the central or widest part when the spring is in its normal horizontal position, and at one end or the other of said bushing when lateral strain at one side or the other induces a torsional movement of the spring, and this adaptability of the contact removes strain and lessens the chances of breakage to the parts when such torsional movement occurs.

End springs 20, 21, of semi-elliptic form and of laminated type (Fig. 3) are placed back to back, spaced apart at their centers and pivotally connected. A lower member 20' of the uppermost spring is formed in its central portion with parallel spaced, downwardly extending ears 20", and an upper member 21' of the lowermost spring is formed in its central portion with parallel spaced, upwardly extending ears 21" received between the ears 20", connected by a central pivot bolt 22. Loosely mounted on the bolt 22 and confined at its ends by the ears 20" and 21" is a barrel-shaped roller 23 or rolling contact member, contacting in its wider central portion with the opposed faces of the members 20' and 21' and adapted to contact at times at its reduced end portions with said members, when a torsional or twisting movement causes either of the springs 20, 21 to be moved out of their normal parallel relations. The ends of the upper spring leaf 21ᵃ of the lower spring are arched outwardly and upwardly, at 24, 25, outside of the usual spring clips 26, and then turn upwardly and loosely contact the lower surface of end portions of the lowermost member 20' of the upper spring. Thus a rocking, resilient connection is provided between the upper spring 20 and lower spring 21 which absorbs and relieves shocks, jars and relative movement of running gear and frame or body, permitting torsional movement and twists without damage or breaking of the springs. The springs 20, 21, connected substantially as shown, constitute a relief-spring assembly for the rear end of the frame and car body. The spring 21 is connected at its ends to and is carried by the rear ends of the rear side springs 15, 16; and the spring 20 is connected at its ends to and in turn carries the rear ends or horns 13 of the frame bars.

The uppermost leaf 15' of each side spring 15, 16 is formed with an eye 27 and a retainer 28, of yoke form, is mounted in straddling relation on and extends across the top of each eye (Figs. 4 and 5). A rolling contact member, in this instance a ball 29, is carried loosely in the central portion of the bar or body of the retainer 28 and rests on the eye 27. A bolt 30 extends loosely through the eye 27 and through the arms of the retainer 28 and a stirrup 31 is mounted on the inner end of each bolt. The stirrup 31 is somewhat wider than the adjacent arm of the retainer 28 and is formed with side flanges 31' between which said arm is received; and said arm and the stirrup is formed with a bottom flange or lip 31" extending beneath the shorter arm and engaging the adjacent end of the retainer 28. The stirrup 31 is formed with a transverse slot 31'" overlapping and extending above the top of the retainer 28 and the lowermost two leaves of the spring 21 extend at their ends through said slots in two spaced stirrups (Fig. 3). The lowermost leaf 21'" of the spring 21 extends at each end across a retainer 28 and rests on the ball 29 and is formed with an end flange 21'''' overlapping the outer end and arm of the retainer. The leaf 21'" having flanges 21''''' on its opposite ends embracing the spaced retainers on opposite side springs 15, 16, the spring 21 tends to prevent undue separation or spreading of the rear ends of said side springs; yet there is a space between each of the end flanges 21'''' and the adjacent wall of the retainer which permits some freedom of movement by canting, twisting or torsion of the side springs without binding or cramping the same and the end portions of said leaf ride on the balls 29 whereby endwise movement of said end portions of the leaf relative to the spaced retainers, under rise and fall of the center of the end spring, is permitted. Similarly the balls, or either of them, will roll on and transversely of the lower face of the end portions of the leaf 21'''' under endwise movement of the rear ends of the side springs 15, 16 due to vertical vibration of the eyes 27. It is not likely that at any time the inner wall of either eye 27 will contact with the bolt 30, or that there will be any noticeable wear of the bolt or eye or leaf end in use, owing to the elimination of the ordinary shackle arrangement and the substitution therefor of the rolling contact devices. The second leaf 21''''' of the spring 21 extends at its ends nearly to the ends of the leaf 21''' and through the slots 31''' in the stirrups 31 and is formed near each end with a transverse struck-up rib 32 extending within and spaced from the concaved crown 33 of a stirrup. Suitable packing strips 34, of material such as felt, may be interposed between the ribs 32 and crowns 33 and be supplied with oil to lubricate the bearing at that point and prevent rusting and corrosion thereof. The inter-relation of the ribs 32 and crowns 33 permits some endwise movement of the end portions of the leaf 21''''' through the stirrups 31 coincident with similar endwise movement of the ends of the leaf 21''' in rolling contact with the balls 29.

The rear ends of the horns 13 are turned downwardly and are formed with inwardly opening recesses 35 shown in Figure 8, within which the opposite ends of the upper two leaves 20''', 20'''' of the upper spring 20 project. The upper two leaves 20''', 20'''' are of substantially the same length and of considerably greater length than the other leaves of the spring 20, and the second of said leaves, 20'''', rests at its ends on bolts 36 extending across the recesses 35 in a direction longitudinally of the body of the vehicle. At it ends the leaf 20'''' is formed with downturned portions 20ᵃ curving partially around but spaced from the bolts 36. Between the uppermost leaf 20''' and the top wall of the recess 35 is mounted a rolling contact member 37, such as a barrel-shaped roller similar to those previously described, and the end of the leaf 20''' is formed with an upturned portion 20ᵇ curving partially around but spaced from said roller. Thus some longitudinal movement of the leaves 20''', 20'''' is permitted in the recesses 35, when the spring 20 is lengthened or shortened by vibration in use, said leaves moving freely and with a minimum of friction between the bolts 36 and rollers 37, and the oppositely curved portions 20ᵃ, 20ᵇ serve to limit such movement and prevent accidental removal of the leaves from between said bolts and rollers. The shape of the rollers 37 permits some torsional movement of the spring 70 without undue strain or danger of breakage as previously described, and its limit of travel is defined by a groove 35' formed in the top wall of the recess 35.

In Figure 10 a modified construction is shown in which the uppermost platform spring 20 is omitted and in lieu thereof a rigid bar 38 is transversely arranged and rigidly connected at its ends with, or integrally formed on, the rear ends of the frame bars 10, 11 or horns 13. The lower spring 21 is employed as previously described, and its spaced ears 21'' are pivotally connected by a bolt 39 to similar spaced ears 38' formed on and extending downwardly from the central portion of the bar 38. Mounted on the bolt 39, and contacting the upper member 21' of the spring and the lower surface of the bar 38, is a barrel-shaped roller 40, which has the same function as previously described. The use of the rigid bar 38 as a cross member in connection with a spring 21 provides some but not all of the advantages of the full platform type, and is a decided advantage over the construction wherein the ordinary spring shackles are employed.

The provision of the platform springs at the rear, pivotally connected at their centers and flexibly connected at their ends respectively to the side springs and to the frame horns, produces in effect a three-point suspension means for the rear end of the vehicle; and undue rolling thereof in rounding corners and the like may be prevented by the commonly used snubbers (not shown).

I claim as my invention—

1. In a spring construction, the combination with a frame and rear axle, of rear side springs carried by said rear axle and pivoted to the frame at their forward ends, and rear end springs connected substantially at their centers and extending across the rear end of the frame and the rear ends of said side springs, one of said rear end springs pivotally connected at its ends to the rear ends of the frame and the other rear end spring overlapping the rear ends of the side springs, and rolling contact members interposed between said overlapping end portions of the springs.

2. The combination with frame bars and side springs beneath and pivoted at one end each to said bars, of a rear end relief spring comprising two transversely arranged members pivotally connected in their central portions, one of said members being connected at its ends to the rear ends of said frame bars, the other of said members overlapping the rear ends of the side springs, and rolling contact members interposed between said overlapping end portions of the members.

3. The combination with frame bars and side springs beneath and pivoted at one end each to said bars, of a rear end relief spring comprising two transversely arranged members arranged one above the other and pivotally connected at their central portions, the lowermost of said transverse members being a laminated semi-elliptic spring having its ends overlapping the rear ends of the side springs, the other transverse member being connected to the rear ends of the frame bars, and rolling contact members interposed between said overlapping end portions of the springs.

4. The combination with frame bars and side springs beneath and pivoted at one end each to said bars, of a rear end relief spring comprising two transversely arranged members arranged one above the other, said members being formed in their central portion with overlapping ears, a bolt pivotally connecting said ears, a barrel-shaped roller on said bolt adapted to engage both of said members, one of said members being connected at its ends to rear ends of the frame bars, the other of said members being a spring overlapping and slidably connected at its ends to the rear ends of the side springs.

5. In a spring construction, the combination of side frame bars, side springs beneath and pivoted at their forward ends to said bars, and a relief spring connecting the rear ends of the bars and side springs, which relief spring consists of laminated semi-elliptic end springs arranged back to back and pivotally connected in their central portions, the uppermost end spring being slidably connected at its ends to the rear ends of said frame bars, the side springs being formed with eyes on their rear ends, end portions of the lowermost end spring overlapping said eyes parallel with the openings therein, and a rolling contact member interposed between said eyes and the overlapping end portions of said end spring.

6. In a spring construction, the combination of side frame bars, side springs beneath and pivoted at their forward ends to said bars, and a relief spring connecting the rear ends of the bars and side springs, which relief spring consists of laminated semi-elliptic end springs arranged back to back and pivotally connected in their central portions, the lowermost end spring overlapping rear end portions of the side springs and slidably connected therewith, the frame bars being formed with inwardly opening recesses at their rear ends, two leaves of the uppermost end spring projecting within said recesses, one of said leaves resting on a bolt extending through said recess and the other leaf being spaced from the top wall of said recess, and a rolling contact member interposed between the last named leaf and the top wall of the recess.

7. The combination of a side spring formed with an eye and a relief spring arranged substantially at right angles to the side spring and formed with an end portion overlapping said eye parallel with the opening therein, and a rolling contact member between and contacting with said eye and the spring portion overlapping the same.

8. The combination of a side spring formed with an eye and a relief spring arranged substantially at right angles to the side spring and formed with an end portion overlapping said eye and also formed with a down-turned flange, a bolt loosely mounted through said eye, a retainer carried by said bolt and loosely embracing said eye and partially embraced by said flange, and a rolling contact member carried by said retainer between and in contact with said eye and spring end.

9. The combination of a side spring formed with an eye and a relief spring arranged substantially at right angles to the side spring and having its ends overlapping said eye and also formed with a down-turned flange, a bolt loosely mounted through said eye, a retainer carried by said bolt and loosely embracing said eye and partially embraced by said flange, a rolling contact member in said retainer, a stirrup carried by said bolt and formed with a slot traversed by the flanged spring end, and flexible connections between said relief spring and stirrup.

10. The combination of two side springs each formed with an eye on one end and a relief spring arranged substantially at right angles to and having its end portions overlapping the eyes of said side springs, and also formed with end flanges extending toward and outside of said eyes, bolts loosely mounted through said eyes, retainers on said bolts loosely embracing said eyes and conjunctively embraced and held against separation by said end flanges, rolling contact members in said retainers between and in contact with said eyes and spring ends, stirrups on said bolts between and transversely of said eyes and spring ends, said stirrups being formed with slots traversed by said spring ends, and flexible connections between said stirrups and spring ends.

11. A member having an eye, a bolt loosely mounted therein, a retainer on said bolt embracing said eye, a ball in said retainer resting on said eye, a stirrup on said bolt formed with a slot, a spring having two leaves extended through said slot, one leaf resting on said ball and formed with an end flange adapted to engage said retainer at times, the other leaf being formed with an offset portion entering a concave in said stirrup.

12. A spring having an eye, another spring overlapping thereon and formed with a member spaced from said eye, a rolling contact member interposed between the first eye and the curved member, a bolt in said eye, and a retainer on said eye engaging said rolling contact member.

13. A member having an eye, a bolt loosely mounted therein, a retainer on said bolt having one arm of less length than the other, a ball in said retainer adapted to roll on said eye, a stirrup on said bolt having a flange adapted to extend beneath the shorter arm of the retainer, said stirrup being formed with a slot, a spring having two leaves extended through said slot, one of said leaves resting and adapted for travel on said ball, and formed with an end flange overlapping and adapted to engage said retainer at times opposite to the stirrup, said stirrup being formed with a concave facing said spring and the other leaf of the spring being formed with an offset entering said concave.

14. In a device of the character described, the combination with a frame member, a bracket secured to and depending from said frame member, and a bolt carried in a horizontal position by and extending across said bracket, of a spring formed with an integral eye on one end extending within said bracket and arranged concentric with and spaced from said bolt, and a bushing interposed between said bolt and eye, said bushing being formed with a bore adapted to receive said bolt and also formed with a barrel-shaped periphery adapted to contact variously with the inner surface of said eye, the sides of the bracket limiting endwise movement of said bushing.

15. The combination of a side spring formed with an eye and a relief spring arranged substantially at right angles to the side spring and having its end portion overlapping said eye, a yoke-shaped retainer partially embracing said eye, a bolt loosely mounted through said eye and retainer, and a ball carried by said retainer and in contact with said eye and overlapping spring end.

16. In a spring construction, the combination of side frame bars formed with inwardly opening recesses, side springs beneath and pivoted at their forward ends to said bars, and a relief spring connecting the rear ends of the bars and side springs, which relief spring consists of laminated semi-elliptic end springs arranged back to back and pivotally connected in their central portions, the lowermost end spring overlapping rear end portions of the side springs and flexibly connected therewith, rigid members extending across the recesses of said frame bars, two leaves of the upeprmost end spring projecting within said recesses at their ends and resting on said rigid members, and a rolling contact member interposed between the upermost of said leaves and the top wall of the recess, said leaves having their ends oppositely curved partially around but spaced from said rigid member and rolling contact member respectively.

17. The combination of two side springs each formed with an eye on one end and a relief spring arranged substantially at right angles to and having its end portions overlapping the eyes of said side springs and flexibly connected thereto, said relief spring comprising two transversely arranged semi-elliptic springs arranged back to back, said members being formed in their central portions with overlapping ears, a bolt pivotally connecting said ears, a barrel-shaped roller on said bolt adapted to contact both of said members, the other of said semi-elliptic springs being connected at its ends to the rear ends of the frame bars, the uppermost leaf of the lower semi-elliptic spring being arched outwardly at its ends and engaging the lower surface of the upper semi-elliptic spring at points spaced from said pivot bolt.

18. In a device of the character described, means for connecting a leaf spring for articulation and lateral oscillation relative to a channeled member supported thereby, comprising an integral eye on one end of said spring adapted to enter the channel of said member, a bushing mounted loosely in said eye and formed with a barrel-shaped periphery adapted to engage the inner surface thereof and also formed with a central longitudinal bore, and a supporting and connecting device mounted in said bore and extending through the sides of the channeled member.

Signed at Des Moines, in the county of Polk and State of Iowa, this 22d day of January, 1924.

LINDSAY H. TIMMONS.